United States Patent

[11] 3,557,840

| [72] | Inventor | Richard C. Maybee |
| | | Oakville, Ontario, Canada |
| [21] | Appl. No. | 727,778 |
| [22] | Filed | May 9, 1968 |
| [45] | Patented | Jan. 26, 1971 |
| [73] | Assignee | Atlas Chemical Industries, Inc. |
| | | Wilmington, Del. |
| | | a corporation of Delaware |

[54] CELLULAR PLASTIC FOAM INSULATION BOARD STRUCTURES
13 Claims, 10 Drawing Figs.
[52] U.S. Cl.................................................. 138/149
[51] Int. Cl.................................................. F16l 9/14
[50] Field of Search........................................... 264/41;
138/143, 118, 149; 156/30

[56] References Cited
UNITED STATES PATENTS

| 3,012,923 | 12/1961 | Slayter | 156/30 |
| 1,734,209 | 11/1929 | Huffine | 138/149 |
| 3,151,633 | 10/1964 | Shuman | 138/149X |
| 3,289,702 | 12/1966 | Sherburne | 138/118 |

Primary Examiner—Louis K. Rimrodt
Attorneys—Kenneth E. Mulford, Roger R. Horton and Ernest G. Almy ABSTRACT: Preformed cellular plastic foam insulation board structures are provided typically with a hand deformable outer skin surface. In the preferred embodiment, the preformed cellular plastic is polyurethane foam which may appear as a sandwich configuration between inner and outer hand deformable skin surfaces. Various insulation configurations are also provided for insulating line pipe, combinations of traced pipes, joints, unions, ducts, and the like.

PATENTED JAN 26 1971 3,557,840

INVENTOR.
Richard C. Maybee
BY
Eugene M. Bond

*INVENTOR.*
Richard C. Maybee
BY

CELLULAR PLASTIC FOAM INSULATION BOARD STRUCTURES

This invention relates to the preparation of rigid cellular plastic foam insulation disposed typically on a hand deformable skin surface, and particularly to the utilization of preformed cellular plastic foam insulation board structures for installation about cylindrical structures. More particularly, the present invention provides preformed polyurethane foam insulation board structures and a method for preparing same having at least one outer hand deformable outer skin surface.

Preformed rock-wool type insulating structures having inwardly extending V-shaped cuts particularly adapted for installation about circular or cylindrical structures are known such as disclosed by Hall in U.S.Pat.No. 1,611,907. However, because of the fibrous nature of rock-wool type materials, extended reinforcement anchor members are required for support which limit the insulating effectiveness and increase difficulties in application as well as cost of the material.

Rigid polyurethane foams have also been used heretofore as insulation for pipes, ducts, and the like. Typically, rigid polyurethane foams have been prepared about such structures as poured-in-place rigid foams or alternately have been prepared as preformed slabs designed specifically to fit particular shapes or configurations. One disadvantage of foaming-in-place insulation is that highly skilled individuals are required to uniformly and efficiently insulate structures; whereas preformed slabs used heretofore suffer the inherent disadvantage, among others, of requiring a large inventory for structural variety with great waste of material and high handling cost of cutting and specially fashioning preformed slabs to fit particular fixtures.

Polyurethane panels have been installed about very large diameter, circular, or cylindrical structures. In order to avoid rupture of the panels, it is necessary to cut the foam panel part way through at regularly spaced intervals, with an electric rotary saw, so that the panels may be bent to a desired arc (Rigid Plastics Foams by T. H. Ferrigno, at pages 113 —115, Reinhold Publishing Corporation, New York). These polyurethane panels, however, have little application to small diameter pipes and generally retain the inherent difficulties encountered when applying polyurethane insulation about cylindrical objects by installation craftsmen.

It has now been found that by the practice of the present invention preformed rigid cellular plastic foam insulation structures are provided which are relatively simple and inexpensive to prepare and which may be readily applied, without requiring high-skilled craftsmen, to a variety of different fixtures.

Generally stated, the present invention provides rigid cellular plastic polymers foamed generally on a hand deformable skin surface. In a preferred embodiment, the cellular plastic polymer is polyurethane prepared by reacting a polyfunctional isocyanate, a polyfunctional hydroxy base material, a blowing agent, catalyst, and possibly a cell size regulator. In the preferred embodiment, polyurethane polymer is foamed as a sandwich board structure between two thin skin surfaces. Thereafter, the foamed urethane polymer laminated slab is grooved in a prescribed fashion to provide a preformed board configuration which may be readily installed as insulation about line pipe, combinations of traced pipes, joints, unions, ducts, and the like.

The invention will be further described with particular emphasis on the use of polyurethane as the cellular plastic material, although other cellular plastics as defined hereinafter may also prove useful in the practice of the present invention.

Referring to the drawings in which like elements are designated by similar numerals throughout the several views.

Figure 1:
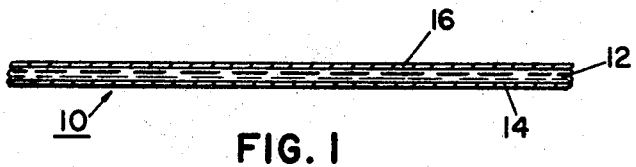
FIG. 1 is a side elevational view of a urethane resin composition sandwiched between hand deformable skin surfaces immediately prior to foaming.

In the drawings, FIG. 1 illustrates sandwich structure 10 with urethane resin 12 immediately prior to foaming and having hand deformable outer skin surface 14 and hand deformable inner skin surface 16. Although the urethane resin is illustrated to be foamed with the skin surfaces in place for convenience, it is recognized that foaming to a slab may initially take place and thereafter the skin surface or surfaces may be applied by any suitable means. It is also recognized that foaming may initially take place such as to form a polyurethane bun from which a series of slabs may be cut and processed by the practice of the present invention.

Urethane resin 12 used to prepare the present rigid foam structure may include a polyfunctional isocyanate, a polyfunctional hydroxy base material, a blowing agent, catalyst, possibly a cell size regulator, and, if desired, fillers or special purpose additives. The urethane resin 12 may be applied on outer skin surface 14 by different processing methods such as pour-in-place, frott-in-place, or spray-in-place methods which have been used for preparing molded or free-rise cellular plastic products. The process used may be continuous, semicontinuous or batch as desired.

The polyfunctional isocyanate found useful herein may be a material identified as a polyphenyl polymethylene polyisocyanate, and specifically exemplified by 4,4 '-diphenylmethane diisocyanate. Other related polyfunctional isocyanates, as well as mixtures thereof, may also be usefully employed provided they possess a functionality of 2 or more, and desirably a functionality of about 2.7 to about 3.0.

A polyfunctional hydroxy base material found useful herein may be tall oil; castor oil and its derivatives; polyesters derived from polyols and di- or polyfunctional acids; and polyethers generally based on propylene oxide adducts of various polyfunctional alcohols or amines such as glycerine, pentaerythritol, trimethylolpropane, sorbitol, α-methyl glucoside, sucrose, ethylenediamine, and the like. More specifically, it has been found that the polyoxyethylene and polyoxypropylene derivatives of polyols such as sorbitol are particularly useful for preparing a rigid foam having desirable insulation properties. An example of a useful compound in this latter grouping is polyoxypropylene (8) sorbitol. Other materials may also prove useful.

In general, the polyfunctional isocyanate and polyfunctional hydroxy base materials are employed in amounts necessary to achieve a desired chain reaction extension or network formation. Foams prepared herein may have residual unreacted hydroxyl and/or isocyanate radicals. In general, 1 equivalent of polyfunctional hydroxy base material is used with about 0.8 to about 1.5 equivalents and preferably about 1.05 to about 1.15 equivalents of polyfunctional isocyanate material; although it is recognized that these ratios may be varied as desired.

In the preparation of the present foam, it has been found useful to include an effective amount of a known phosphate flame retardant material such as tris (2 chloroethyl) phosphate, tris (dichloropropyl) phosphate, ammonium phosphate, or the like. Antimony oxide may also prove useful.

The blowing agent used herein is desirably a resin nonsoluble, gas producing liquid such as, for example, a halogen substituted lower molecular weight alkane exemplified by trichlorofluoromethane, di-chloro-di-fluoromethane, chloro-difluoromethane, di-chloro-tetra-fluoroethane, and tri-chloro-tri-fluoroethane.

The amount of blowing agent generally used herein is between about 6 percent to about 25 percent by weight based on the total weight of the polyfunctional urethane materials used. It is preferred, however, to employ from about 13 percent to about 18 percent by weight, as based on the total weight of the isocyanate reactant materials used.

Catalysts found useful herein may be taken from, for example, organotins such as stannous octoate, stannous oleate, dibutyltin dilaurate; and dialkyl-alkanol-amines such as dimethylethanolamine. 2,2,2,-diazabicylcooctane and trimethyl-piperazine may also prove useful as may other related compounds as well as any combination of these various materials.

A cell size regulator found useful herein is water-soluble silicone such as dimethyl siloxane having, for example, a viscosity at 20° C. of about 50 centipoises. The amount of cell size regulator which is generally used is an amount of about 0.1 percent to about 2 percent by weight of the total amount of isocyanate reactants to provide useful foams of high closed cell content and, hence, relatively low moisture permeability and high strength properties.

Various fillers and special purpose additives may be used to reduce foam cost or impart special properties as desired. Fillers such as cellulose derivatives, synthetic fibers; silica and silicates, inorganic flakes and fibers of materials such as glass, mica, and asbestos; and coal tar pitch or asphalts may also prove useful.

Other compounding ingredients which may be added in making the present polyurethane foam include wetting agents, emulsifiers, tall oil, titanium dioxide, fungicides, antidegradants, and the like. Small amounts of water may be added to the mixture to facilitate blowing.

Special purpose additives such as flame retardants which may be included in the present polyurethane foam are added in an amount of less than about 15 percent by weight of the isocyanate reactant components used to prepare the rigid foam.

In forming the present foam, a prepolymer of a mixture of prepolymers may be initially prepared. The prepolymer may contain residual free isocyanate groups for subsequent reaction with a crosslinking agent. If, however, the prepolymer is hydroxyl terminated, additional polyisocyanate is added to the reaction mixture.

The heat of reaction cause by reacting the polyfunctional hydroxy material and the polyfunctional isocyanate material causes blowing of the foam, usually after the polyurethane reaction has proceeded enough to entrap the generated gases. Alternatively, external heat may be applied for foaming is if necessary.

Figure 2:
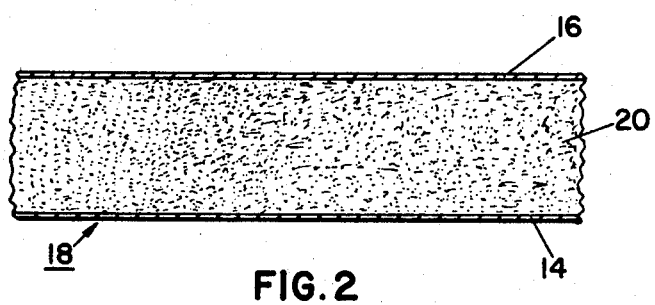
FIG. 2 is a side elevational view of a rigid sandwich polyurethane foam board after forming.

After urethane resin 12 is foamed, polyurethane sandwich 18 results as illustrated in FIG. 2 which rigid polyurethane foam 20 and adhering hand deformable outer skin surface 14 and hand deformable inner skin surface 16.

A variety of hand deformable skin surfaces may be employed herein. The useful hand deformable skin surfaces may be formed of either metallic or nonmetallic materials. Metallic materials found useful for forming the hand deformable skin surfaces include materials such as sheets of aluminum various steels, copper and the like having a hand deformable thickness from about one-half to about 20 mils, and preferably about 1½ to about 10 mils.

Nonmetallic materials found useful for forming the hand deformable skin surfaces include materials such as plain or coated paper, wood sheeting, dry or asphalt saturated felts, woven or batting fibers; polymeric materials such as polyvinyl chloride, polyethylene, polytetrafluoroethylene; or various other materials which are hand deformable and have a deformable skin surface with a thickness from about 5 to about 100 mils.

It is to be understood that hand deformable skin surfaces as used herein are those deformable by an ordinarily skilled worker who typically installs insulation such as that related to the present invention. It is recognized, however, that the present invention may less advantageously be applied, because of limited facilities for on-the-job installation, to skin surfaces which require mechanical aids for deforming such insulation about a cylindrical surface.

The present skin surfaces advantageously provide a surface which may have aesthetic appeal, it is easy to clean, and limits the undesirable tendency of some cellular plastic materials to absorb moisture.

Figure 3:
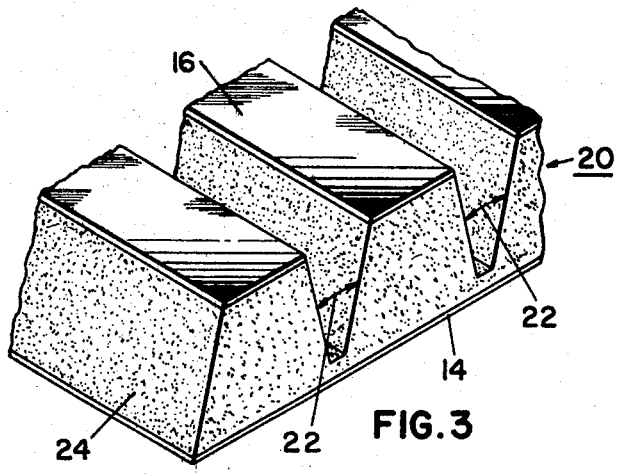
FIG. 3 is a perspective view taken as a partial section and illustrating the present preformed rigid polyurethane grooved sandwich board insulation structure.

When polyurethane sandwich 18 is grooved, preformed insulation 20 of FIG. 3, results having outer skin surface 14 and inner skin surface 16. Inner skin surface 16 appears in sections with portions removed by grooved V-shaped slots 22 and tapered end surface 24. The grooves may be cut or otherwise formed as desired.

Figure 4:
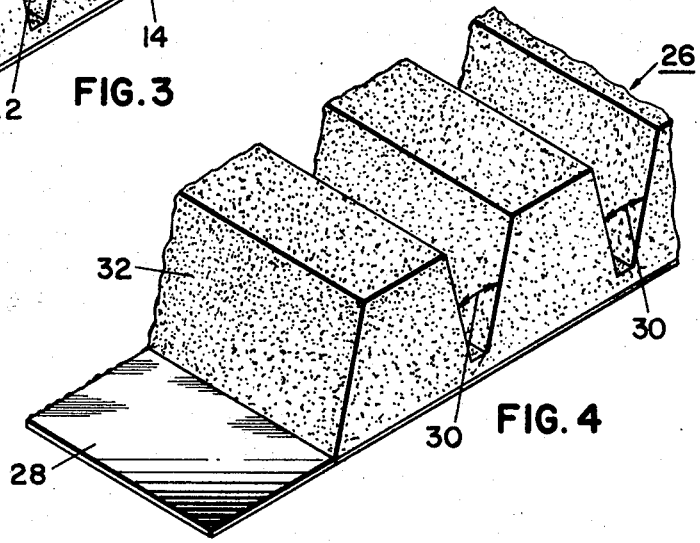
FIG. 4 is a perspective view taken of an embodiment preformed rigid polyurethane grooved board insulation structure having an extended skin surface on one side thereof.

Grooved V-shaped slots 22 appear ideally in the present sandwich structure as a V, the apex of which terminates at the inner surface of the outer skin surface layer. Practically, however, to avoid segmentation by rupture of the apex of the V, a truncated or modified V is more desirably formed in the sandwich structure. The truncated portion remaining in the sandwich structure is less than an amount which prevents substantially complete closure of the sandwich structure when installed. The minimum amount of truncated portion remaining in the sandwich structure is an amount greater than that which will fracture upon installation and cause segmentation of the foam portion of the structure. The depth of a typical truncated 30° section is of the magnitude of about ⅛ inch relative to about a 1-inch thick foam slab; although larger truncated sections may advantageously be employed, in particular, for foam slabs of greater than 1-inch thickness. FIG. 4 illustrates an embodiment of the present invention wherein the inner skin 16 of FIG. 3 is eliminated to form laminate polyurethane insulation structure 26 having an extended outer skin 28 beyond tapered end surface 32 and a tapered angle to the horizontal substantially equal to the corresponding surface formed of grooved sections 30. The additional feature of extended outer skin 28 permits the use of a sealing means when the insulation is configurated as described hereinafter. One method by the which the present embodiment may be formed is by cutting a series of slabs from a foamed polyurethane bun and thereafter V grooving the slabs which are then applied to outer skin 28.

It has been found particularly useful to form the present insulation, along a length as desired, with eleven central grooves having an angle defined by either groove 22 or groove 30 to be about 30° while the angles of the end surfaces such as surface 24 and surface 32 are about 15° from a vertical line perpendicular to the horizontal outer skin surface 14 or outer skin surface 28 respectively.

The angles of the grooves may be varied, however, from as low as 5° to as great as 90°, with a range of about 15° to 90° sufficient for most installation uses. The latter range is thus preferred.

Various installation configurations which may be formed by the present grooved and preformed insulation are illustrated in FIGS. 5—10. It is recognized that the various configurations may be insulated with either the sandwich insulation 20 of FIG. 3 or the laminate insulation 26 of FIG. 4.

Figure 5:
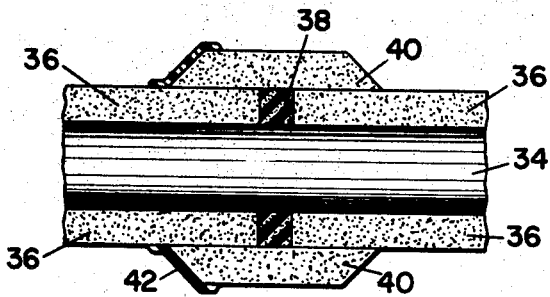
FIG. 5 is a side elevational view of the present rigid polyurethane foam preformed and grooved slab insulation shown in position about a line pipe and having an expansion takeup joint.

In FIG. 5, line pipe 34 is insulated with preformed grooved insulation 36 such as illustrated in either FIG. 3 or 4. When sandwich structure 20 is employed without an extended outer skin surface, since it may appear with the extended skin, the mating end surfaces may be joined with a strip of pressure sensitive adhesive tape not shown. The tape may include a variety of other adhesives and may include a heat reflective surface for better insulation, if desired. Various other forming means, compositions of tape or adhesives, may be used as desired. When either the outer skin surface of sandwich structure 20 or that of laminate structure 26 is extended, a suitable adhesive may simply be applied when the insulation is configured in insulating position to join the outside mating surfaces.

In order to provide for expansion and contraction of an insulated pipe 34, elastic spacers 38 may be included. These elastic spacers may be constructed of any suitable material such as sponge rubber or plastic. Other conventional expansion takeup materials may also be employed. Elastic spacers 38 may be covered with spacer insulation 40 formed of the same material as insulation 36 and supported along one side by retainer 42 which may be plastic, paper, metal, or the like, secured in position by any suitable means such as staples, pins, adhesives, and etc.

Figure 6:
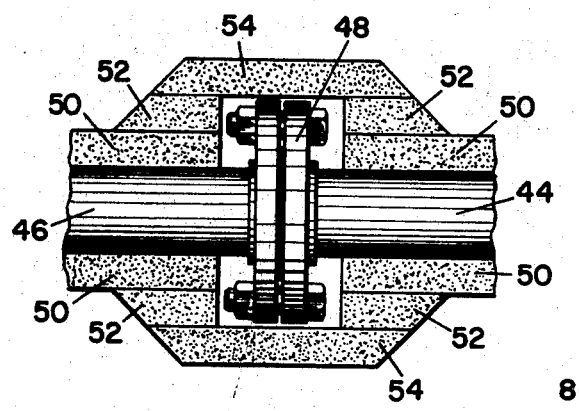
FIG. 6 is a side elevational view of the present rigid polyurethane foam preformed and grooved slab insulation shown in position about a flanged union connection.

In FIG. 6, line pipes 44 and 46 are illustrated joined by flanged union 48. Insulation 50 is provided about the line pipes; and, to cover union 48, intermediate insulation 52 is included which is then covered by an outer covering layer 54. Insulations 50, 52, and 54 are constructed of the rigid polyurethane insulation of this invention.

Figure 7:
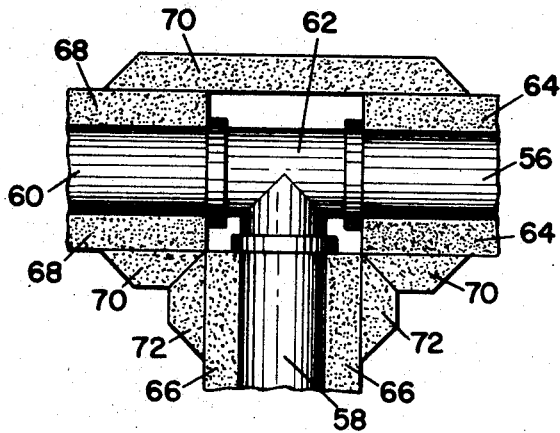
FIG. 7 is a side elevational view of the present rigid polyurethane foam preformed and grooved slab insulation shown in position about a T-joint.

In FIG. 7, line pipes 56, 58, and 60 are joined by T-joint 62. Insulation 64 is used to cover line pipe 56; and, in similar fashion, insulation 66 covers line pipe 58 and insulation 68 covers line pipe 60. Thereafter, a portion of preformed insulation is removed from each side of an insulation sheet and is applied as outer covering 70. An additional segment 72 may then be applied to complete the insulation of T-joint 62. Other variations of joints may be similarly covered as illustrated in FIGS. 6 and 7.

Figure 8:
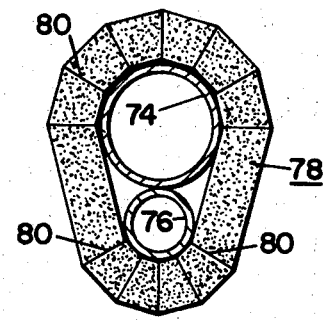
FIG. 8 is a front elevational view of the present rigid polyurethane foam preformed and grooved slab insulation shown in position about two line pipes.

FIG. 8 illustrates how the present insulation may be positioned about two line pipes 74 and 76. Insulation covering 78 is grooved with eleven spaced slots 80 and two mating surfaces which form a twelfth slot. Generally, the slotting results in a series of segments which are symmetrical about a line through the center of gravity of the final assembly.

Figure 9:
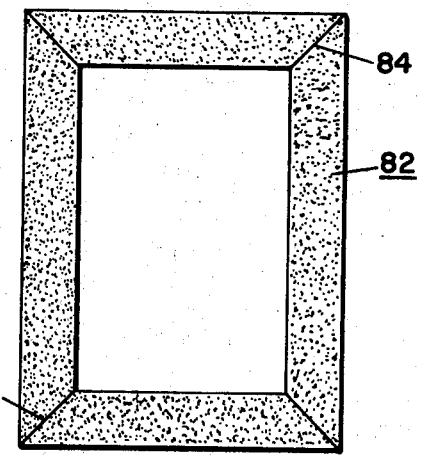
FIG. 9 is a front elevational view of the present rigid polyurethane foam preformed and grooved slab insulation formed as an insulated duct.

FIG. 9 illustrates duct 82 formed of the present insulation by cutting three, 90° grooves in a flat board with mating end surfaces formed as 45° surfaces to a vertical line perpendicular to the outer slat skin surface. When united at a corner, the final duct, of either square or rectangular configurations, has the general configuration of FIG. 9.

Figure 10:
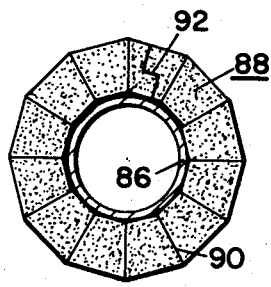
FIG. 10 is a front elevational view of the present polyurethane foam preformed and grooved slab insulation shown in position about a line pipe.

FIG. 10 illustrates line pipe 86 covered with insulation 88 and having twelve slots 90 formed about the circumference. In addition, stepped slot 92 is included to provide a more effective closing for restricting heat transfer through the area where the configuration is united by, for example, tape or the like. Other closing configurations may also be employed.

Although the present rigid polyurethane boards may be prepared without using an adhesive material disposed between the foam and outer or inner skin surfaces, additionally an adhesive may be included if desired. Further, intermediate layers of, for example, waterproofing or vaporproofing materials may be included as may other specific purpose layers.

The present polyurethane boards, when used for insulating purposes, are sufficiently light in weight to be suspended directly on the unit being insulated without requiring added suspension devices. When the present polyurethane boards are formed as a duct, conventional hangers may be employed.

Polyurethane foams prepared according to this invention are found to have a foam density in the range of about 1 to about 5 lbs./cubic foot and preferably about 1½ to about 2½ lbs./cubic foot. Generally, the thermal conductivity of the prepared polyurethane foams is about 0.10 to about 0.16, preferably about 0.13 to about 0.15 BTU/(hr.) (ft.$^2$) (°F./in.) at 70° F.

A typical compressive strength for the present foam is about 10 to about 200 and preferably about 15 to about 40 p.s.i. yield.

Water absorption for the present foam may be categorized as entering surface cells only with substantially no capillarity. The vapor transmission is about ½—2 perms/inch. Vapor transmission in perms of a cellular material may be defined as the number of grams of water transmitted through a body thereof, per square foot of surface area, per hour, per inch of mercury pressure.

A rigid polyurethane foam having a density of about 1½ to about 2½ lbs. per cubic foot, a yield point in compression of 20 to 30 lbs. per square inch having about 95-99 percent closed cells, and a coefficient of thermal conductivity or K factor at 70° of from 0.1 to 0.16 BTU/(hr.) (ft.$^2$) (°F./in.) is most desirable for use as the rigid foam in the present structure.

In order to further seal the insulating material and increase its insulating properties, any exposed surface may be coated prior to or after foaming with a thin layer of polyvinyl alcohol, chlorosulfonated polyethylene, or related material. This seal may also serve as an effective barrier to water, moisture, and undesirable gases.

Although the foregoing description has been particularly applied to polyurethane to exemplify a useful cellular plastic material, other plastic materials of the type which may be foamed such that the air cells are not substantially interconnected may also prove useful. Cellular plastic materials for use herein may thus include materials such as polystyrene; polyvinyl chloride, and related vinyl chloride resins; polyethylene; graft polymers such as of styrene, acrylonitrile, polybutadiene; and the like may also prove useful as may other materials capable of forming substantially rigid foams and desirably having good insulation properties.

It is understood that the foregoing detailed description is given merely by way of illustration and that many variations may be made therein without departing from this invention.

I claim:

1. A preformed insulation board structure which comprises a rigid cellular plastic foam adhered to a continuous hand deformable skin surface; rigid cellular plastic foam having a series of truncated V-shaped grooves formed substantially through the thickness of the rigid cellular plastic foam, and mating tapered end surfaces for union when the insulation board structure is installed.

2. The preformed insulation board structure of claim 1 wherein a hand deformable skin surface is adhered to the remaining cellular plastic surfaces opposite said continuous hand deformable skin surface after said truncated V-shaped grooves are formed.

3. The preformed insulation board of claim 1 wherein said continuous hand deformable skin surface extends beyond one of said mating and tapered end surfaces.

4. A four-sided duct formed of the insulation board of claim 1.

5. A twelve-sided insulation structure formed of the insulation board of claim 1 about a line pipe, joint, traced pipes, or pipe union.

6. The preformed insulation board of claim 1 wherein the rigid cellular plastic foam is polyurethane foam.

7. The preformed insulation board of claim 1 wherein the hand deformable skin surface is a metallic material having a thickness of about ½ to about 20 mils.

8. The preformed insulation board of claim 7 wherein the metallic material has a thickness of about 1½ to about 10 mils.

9. The preformed insulation board of claim 1 wherein the truncated portion of said V-shaped grooves is about ⅛ inch thick relative to about 1-inch thick cellular plastic foam board.

10. The preformed insulation board of claim 1 wherein the V-shaped grooves have an internal angle of about 5° to about 90°.

11. The preformed insulation board of claim 10 wherein the internal angle is about 15° to about 90°.

12. The preformed insulation board of claim 10 wherein the internal angle is 30°.

13. The preformed insulation board structure of claim 1 wherein the apexes of said truncated V-shaped grooves are at about the inner surface of the hand deformable skin surface.